(12) United States Patent
Goulet

(10) Patent No.: US 12,039,529 B1
(45) Date of Patent: Jul. 16, 2024

(54) CLOSED LOOP BLOCKCHAIN GATEWAY SYSTEM

(71) Applicant: Platinum Digital, Inc., Los Angeles, CA (US)

(72) Inventor: Joseph T. Goulet, Los Angeles, CA (US)

(73) Assignee: Platinum Digital Inc., Los Angeles, CA (US)

( * ) Notice: Subject to any disclaimer, the term of this patent is extended or adjusted under 35 U.S.C. 154(b) by 341 days.

(21) Appl. No.: 16/691,602

(22) Filed: Nov. 21, 2019

Related U.S. Application Data

(60) Provisional application No. 62/770,684, filed on Nov. 21, 2018.

(51) Int. Cl.
| | | |
|---|---|---|
| *G06Q 20/38* | (2012.01) | |
| *G06Q 20/04* | (2012.01) | |
| *G06Q 20/36* | (2012.01) | |
| *G06Q 20/40* | (2012.01) | |

(52) U.S. Cl.
CPC ....... *G06Q 20/389* (2013.01); *G06Q 20/0457* (2013.01); *G06Q 20/36* (2013.01); *G06Q 20/3829* (2013.01); *G06Q 20/405* (2013.01); *G06Q 2220/00* (2013.01)

(58) Field of Classification Search
CPC ............. G06Q 20/389; G06Q 20/0457; G06Q 20/36; G06Q 20/3829; G06Q 20/405; G06Q 2220/00
See application file for complete search history.

(56) References Cited

U.S. PATENT DOCUMENTS

| | | |
|---|---|---|
| 9,849,364 B2 | 12/2017 | Tran et al. |
| 10,230,530 B2 | 5/2019 | Lancashire et al. |
| 10,367,645 B2 | 7/2019 | Dechu et al. |
| 10,411,905 B2 | 9/2019 | Smith et al. |
| 10,430,563 B2 | 10/2019 | Mintz et al. |
| 10,438,290 B1 | 10/2019 | Winklevoss et al. |
| 10,447,480 B2 | 10/2019 | Alas et al. |
| 11,276,056 B2 * | 3/2022 | Snow .................. G06Q 20/367 |
| 2007/0288319 A1 * | 12/2007 | Robinson ........... G06Q 30/0225 705/14.25 |
| 2019/0340266 A1 | 11/2019 | Vo et al. |
| 2020/0074461 A1 | 3/2020 | DeRosa-Grund |

FOREIGN PATENT DOCUMENTS

| | | | |
|---|---|---|---|
| CN | 111080287 A * | 4/2020 | |
| CN | 111080287 A | 4/2020 | |
| WO | 2020092900 A2 | 5/2020 | |
| WO | WO-2020092900 A2 * | 5/2020 | ........... G06F 21/602 |

OTHER PUBLICATIONS

"Block Applications Are Everywhere—Seven Dimensional Exchange Token Opens the New Era of Intelligent Tourism Entertainment Industry", M2 Presswire—Sep. 24, 2018 (Year: 2018).*

* cited by examiner

*Primary Examiner* — Duan Zhang
(74) *Attorney, Agent, or Firm* — BUCHALTER; Cecily Anne O'Regan; Michael Tait

(57) ABSTRACT

Exemplary embodiments described herein include a closed loop gateway. The closed-loop gateway comprises a block chain system for tracking exchanges between users of the closed-loop gateway. The closed-loop gateway permits the exchanges to be tracked from an original source through subsequent users to permit the original source to impose conditions, restrictions, and rules on the subsequent exchanges.

11 Claims, 5 Drawing Sheets

CLOSED LOOP BLOCKCHAIN GATEWAY SYSTEM

BACKGROUND

Current transactions to exchange goods, products, and services contemplate sellers offering and selling goods to buyers in exchange for currency or another good or service. Conventionally, after the good or product leaves or the service is performed by the seller, this primary market or original seller loses control of the good or the buyer receives the benefit of the service, and the buyer can do anything with the good or the benefit of the service. This may include reselling the good, and reselling a ticket to an event that is the service, at a higher price than originally purchased from the seller. When selling a number of products, a primary market seller may judge supply of, interest in, and demand for the products, goods, and services as purchases are made, and may adjust the sales price for subsequent buyers to optimize demand and increase profits. Popular items may be sold by the seller at a higher price to later buyers than to earlier buyers.

When a quantity of goods and products go on sale virtually or in an electronic or on-line marketplace or exchange, market forces and consumer interest can be difficult to anticipate in real-time because consumer interest and demand can change rapidly over the course of 100s, 1000s, or more inquiries and transactions. As a result, a seller may not be able to effectively monitor and respond to the changes, and to modify and adjust product supply and pricing in response to demand. The problem may be amplified and compounded by automated, electronically programmable on-line purchasing software, sometimes referred to as "bots". Such on-line bots can be programmed and deployed by bulk purchasers seeking to rapidly buy large quantities or product quickly, instantaneously, and/or almost simultaneously, and at least over short durations of time. These bots can rapidly consume and purchase all available product before a seller can take action to identify the problem and limit quantities. This problem is been especially pronounced during on-line sales of popular products and services that include, for example, well-known celebrity media event and concert tickets, branded shoes, video games, among many other products and services.

Consequently, the seller is limited in its ability to judge demand and market interest, and is left unable to: 1) sell directly to individual buyers, 2) respond to such instantaneous demand so as to limit quantities per purchaser, 3) adjust pricing higher when confronted with strong demand, and/or 4) achieve the benefit of higher sales prices based on such strong consumer interest, among other detriments. Further, buyers are then subjected to possible artificial limits on supply created by resellers seeking to charge drastically higher prices.

In some instances, the primary market, original seller may even be limited by other commercial or trade restrictions or regulations from adjusting prices in response to bot-driven product or service consumption. However, the secondary market, automated or other types of bot-armed, bulk purchasers of the goods and services may not be so limited. Instead, having obtained a large quantity of the goods, often unimpeded by consumer—protective regulations or controls, the bulk buyer can create a secondary market and control subsequent market supply, demand, and pricing to drive up prices of subsequent resales of the product and goods, which creates disadvantages to both the original seller and subsequent consumers. These disadvantages include the inability of the end purchaser to verify the authenticity of the product or service, the inability of the seller to verify that the consumer purchased the product or service legitimately, and the inability of both the original seller and final purchaser to detect and avoid fraudulent goods and services.

Primary market, original sellers have employed substantial and time consuming methods that attempt to limit the ability of bulk purchasers to buy and resell goods and services. To protect final purchasers, such original sellers seek to limit intermediate, bulk purchasers from consuming large amounts of supplied goods and services, and to prevent them from creating secondary markets that adversely impact fraud detection, customer relationships, and sales and profits that would otherwise accrue to the primary market, original sellers. For example, some sellers will require all buyers to register with and authenticate themselves to a seller's primary market system before the original sale occurs.

The original individual buyer is then provided personalized access to the seller's purchasing platform, and is subject to restrictions on the quantity that can be purchased, and is provided notification of if and how goods and services may be resold to subsequent purchasers. Purchases are then made under the authenticated identity of and personalized access provided to the individual original buyer.

Further, the seller may issue a voucher or other identifying printed or electronic document to the original, individual buyer, which identifies the purchased product or service. The buyer then redeems the voucher to obtain possession of the goods or products or services. Upon redemption of the voucher, the individual must also again verify their identity to ensure the one redeeming or consuming the good or service is the same, original purchaser. In some circumstances where resale is permitted by the original, primary market seller, a resale and subsequent buyer must be similarly verified and authenticated to enable fraud detection, and to ensure legitimate resale and transfer of the product or service to another, among other reasons.

Traditional or conventional voucher-based transactions allow anyone to purchase and then resell and possibly also increase the price of a product or service, uncontrolled by the merchant or original, primary seller. The contemplated online transactions also often include credit/debit-based payments, which conventionally are enabled and implemented by four or more payment-related entities before the transaction is cleared and completed, which further increases costs and the time needed to complete a transaction, and the likelihood of unwanted security issues.

What continues to be needed are improved systems and methods that enable primary market, original sellers to have better electronic control over initial sale and resale on-line, digital, and electronic transactions to detect possible fraud, to prevent intermediate bulk electronic and automated robotic or bot resellers from consuming supply and creating secondary markets, to electronically and automatically manage customer and buyer demand to ensure customer satisfaction, to digitally and electronically ensure authenticity of products, goods, and services that reach ultimate consumers, and to automatically, digitally, and electronically authenticate and verify identity of on-line and digitally enabled customers and buyers to ensure legitimacy and authenticity of digital and electronic vouchers or other identifying digital documents that may be tendered to obtain services, and possession of products and goods.

SUMMARY

Exemplary embodiments include an electronic, online closed loop blockchain gateway and transactional exchange blockchain and systems, components, and computer-implemented methods for operation. This includes for example, hardware-based methods of operation and hardware systems and components that are configured as and include, for example without limitation, at least one and or one or more hardware processor(s) that may be a part of larger computing systems and servers and components. Such are coupled to a network or networks, storage devices, and other hardware and software components and systems. Such components, systems, and computer and hardware implemented methods of operation, which include such exemplary processors, are in communication with one or more storage servers and cryptographic key pair, payment, storage, and other servers. These systems, hardware implemented methods, and components, including the exemplary hardware computer processors, are configured to establish the gateway and closed loop transactional exchange blockchain across the systems, components, and servers.

The processors and related computing, hardware, and software systems and methods of operation are configured to electronically forge genesis blocks of the contemplated blockchains that form the closed loop transactional exchange, wherein the forged blocks include and or identify one or more cryptographic, asset, access right, and other genesis tokens containing data, credentials, and information of the exchange. These methods, components, and systems are further configured to electronically forge one or more merchant and user child blocks that are each forked from the genesis block and having one or more respective merchant and user cryptographic, asset, access right, account, and other tokens having data and credentials.

The system and methods of operation are also configured to electronically identify one or more salable merchant products and or services, by forging at least one merchant asset child block, of the one or more merchant child blocks, which each have at least one merchant product asset token corresponding to the one or more salable merchant products and or services, wherein a one to one, many to one, and one to many relationship between blocks, tokens, and products and services may be utilized. The methods and components of the system also receive by the network from the key pair server, and in response to a first user request, a private key token for a private key of the user, which corresponds to a public user key, which may be stored in the child user blocks and tokens contained therein.

One or more user account tokens and access right tokens, of the one or more user child blocks that correspond to the private key are also identified by the system components and operation methods to enable electronic user authentication and verification. The system also is configured to electronically receive by the network a first user payment via the payment server, which corresponds to the identified one or more user account tokens. The system components receive the payment, by forging payment merchant and user child blocks in the blockchain, wherein each block has a merchant fiat asset token that identifies the first user payment.

The system components and methods of operation, including for example the contemplated processors, also exchange for the first user payment, one or more of the identified merchant products, by forging merchant and user product exchange child blocks in the blockchain or blockchains of the system, in response to the first user payment, wherein each forged block includes generated merchant asset exchange tokens identifying the one or more merchant products that are exchanged.

Such computer-implemented methods, processors, components, and systems are also configured to electronically generate a merchant access right token, which defines at least one and or one or more exchange limits sale and resale of one or more salable merchant products. The exchange sale and resale limits include, for purposes of example but not for limitation, at least one and or one or more of a predetermined: (1) number of sales and resales, (2) price, (3) price range, (4) profit, (5) profit range, (6) profit sharing percentage, (7) quantity, (8) purchaser identity (which can include identities prohibited from purchasing, permitted to purchase, and a combination thereof), and or (9) purchaser geographic location and region, among other possible exchange sale and resale limits. Merchants can in this way electronically assign rights and rules to salable products and services, especially for digitally enabled and or represented products and services, to address problems of prior systems.

In variations, the contemplated components, systems, computer-implemented methods, and processors are configured to electronically generate one or more or at least one user digital wallet asset token that is identified and or contained by at least one forged user child block in the blockchain(s) of the system. Here, the at least one user digital wallet asset token further identifies one or more received user payments, merchant fiat asset tokens, merchant coinbase asset tokens, and other user and merchant asset tokens, which are and may be established by the closed loop transactional exchange and gateway systems, components, and methods of operation.

Further optionally preferred arrangements of the computer-implemented methods, processors, components, and systems, are configured to electronically forge at least one merchant asset child block in the contemplated blockchain(s), which identify a salable digital event ticket of the one or more salable merchant products and services, and a corresponding merchant asset token, among other elements.

This variation further contemplates a redeemable digital voucher asset token is generated that also corresponds to the salable event ticket, and which is generated responsive to detection an exchange of the salable event ticket for the user payment. In this adaptation, a user child block of the blockchain is forged that identifies the redeemable voucher and salable event ticket.

Here, the components, systems, computer-implemented methods, and exemplary processors are also configured to verify a user identity, in response to electronically detecting redemption of the digital redeemable voucher, by identifying at least one of merchant and child blocks having one or more of a user identity account token, the digital event ticket merchant asset token, and other asset tokens. In alternative arrangements of these configurations, a redeemable digital voucher asset token may also be generated, which corresponds to the salable event ticket, and in response to detecting an exchange of the salable event ticket for the user payment.

The contemplated redeemable digital voucher asset token includes at least one of a human readable digital voucher and optical character reader scannable code. The forged user child block may in this variation identify the redeemable voucher, scannable code, and salable event ticket, which are among the one or more salable merchant products. Verification of the user identity is effected in response to communication of at least one of the digital redeemable voucher and scannable code, and is accomplished by identification of at least one of merchant and child blocks having one or more of the user identity account token, the digital event ticket merchant asset token, and other asset tokens, which correspond to at least one of the digital redeemable voucher and or scannable code.

In each of these arrangements and variations, the systems, components, computer-implemented methods, and exemplary processors are configured to enable, use, operate, and implement customizable blockchain enabled and distributed transaction exchanges, which in turn enable verifiable and authenticated merchant control of purchased goods and services. Such are are especially configured to enable such capabilities to accommodate digital and digitally represented goods and services. For example, purchased goods and services may include for example, event ticketing and related merchandising related to high demand, well-known celebrity events. Such purchased goods and services may also be other consumable goods in which the seller wants to control the purchased good and limit or authenticate subsequent exchanges to other would be purchasers to improve quality control and customer trust in merchant branding, and to reduce counterfeiting, theft, and misuse of digital and digitally represented goods and services.

DRAWINGS

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments include systems and methods for creating and defining a closed loop blockchain gateway and marketplace system 100, that enables a merchant and or seller to identify and limit the recipients of salable products, goods, and or services.

Figure 1:
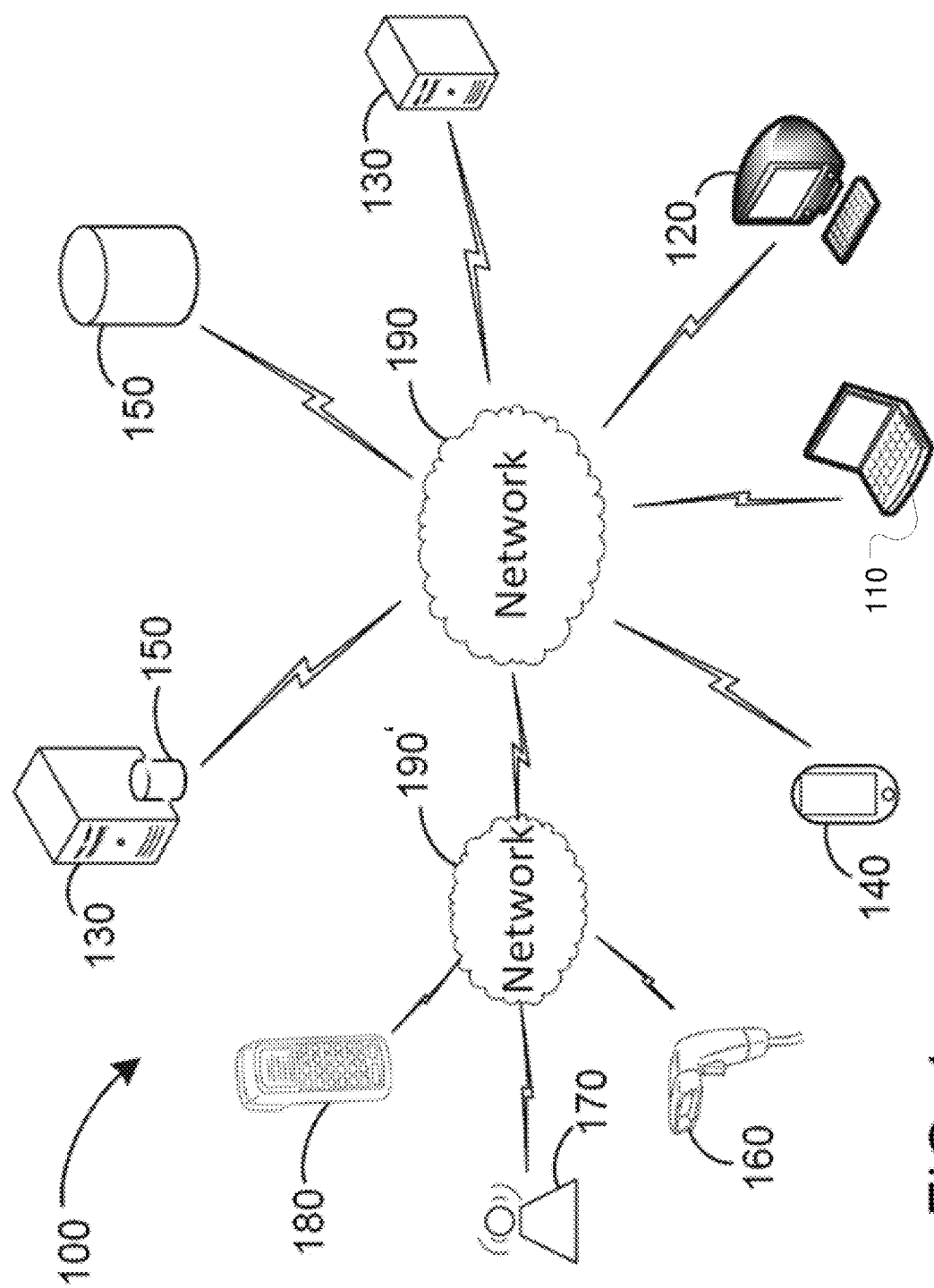
FIG. 1 illustrates an exemplary block diagram of methods according to embodiments described herein.

FIG. 1 illustrates an exemplary system 100 that implements embodiments described herein. Exemplary embodiments of the closed-loop blockchain enabled gateway and system 100 that are contemplated herein may include one or more hardware processors included as part of computers, electronic devices, servers, cloud-based virtual machines, and the like. As used herein, the terms processor(s), computer(s), component(s), system(s), computer-implemented and hardware-implemented method(s), and or electronic device(s) are intended to be broadly interpreted to include a variety of systems, components, and or devices including laptop and personal computers 110, mainframe computers 120, servers and server farms and cloud-based virtual machines 130, which may include set top boxes, and mobile and portable devices 140 such as for example mobile phones, tablets, smart watches, smart displays, and televisions, and similar devices and systems.

Such computers 120 and similar devices can include, for example, integrated and customized processors, memory components for storing data (e.g., read only memory (ROM) and/or random access memory (RAM), other storage and database devices 150, various input/output communication devices and/or modules for network interface capabilities, etc. For example, such systems 120 may include processors and or processing unit including a memory, a processor, an analog-to-digital converter (A/D), a plurality of software routines that may be stored as non-transitory, machine readable instructions in the memory, which are executed by the processors to perform the computer and hardware-implemented methods and processes described herein.

Such processors and processing units of system 100 and components 110, 120, 130, 140, may be based on a variety of commercially available platforms such as the noted personal computer and mainframes 120, workstations and laptops 110, tablets and mobile electronic devices 140, and or may be based on a custom platform that uses application-specific integrated circuits (ASICs) and other custom circuitry to carry out the processes and methods contemplated and described herein.

Additionally, the processors and processing units may be coupled to one or more input/output (I/O) devices that enable a user to interface to the systems 100. By way of example only without limitation, the hardware processors and processing units may receive user inputs via a keyboard, touchscreen, mouse, scanner, button, or any other data input device and may provide graphical displays to the user via a display unit, which may be, for example, a conventional video monitor or television.

As shown, exemplary embodiments may include hardware components (e.g., 2D code reader 160, communication transceiver 170, and/or QR code reader 180A configured to retrieve a paper, digitally encoded, and or exclusively digital redemption voucher, such as through a scannable feature. The scannable feature may be a digitally encoded bar code, two dimensional code, or quick-response (QR) code, which can be scanned, detected, and read by a barcode or 2D code reader 160, QR code reader 180, other wireless communication transceiver 170, etc. The scanned and retrieved redemption voucher may be communicated over one or more networks 190, 190' to local or remote server 130 or other components of system 100 to verify the code and enable an exchange and or transaction.

System 100 may also include a user input such as for providing a pin or password or other identifier. In this case, private keys may be stored on a remote server 130 internal or external to system 100, and be polled, queried, or called upon during a confirmation of an exchange or transaction for products, goods, or services, and when a user communicates a valid pin. The contemplated pin-transaction may occur outside the blockchain of system 100, and may be secured by a number of methods, including for example, with a 2048 bit secure socket layer (SSL) (or similar) encryption technique, which utilizes private keys stored on a hardware security module and retrieved upon entry of the contemplated user pin. The hardware security module may be locally hardware-based or remotely server-based or cloud-based.

The system 100 may also include the one or more large area networks 190, and/or local networks 190 for communicating data from one or more different components of system 100. The one or more electronic devices may include a user interface for displaying information to a user and/or one or more input devices for receiving information from a user. System 100 may receive and/or display the information after communication to or from a remote server 130 or storage database 150.

Figure 2:
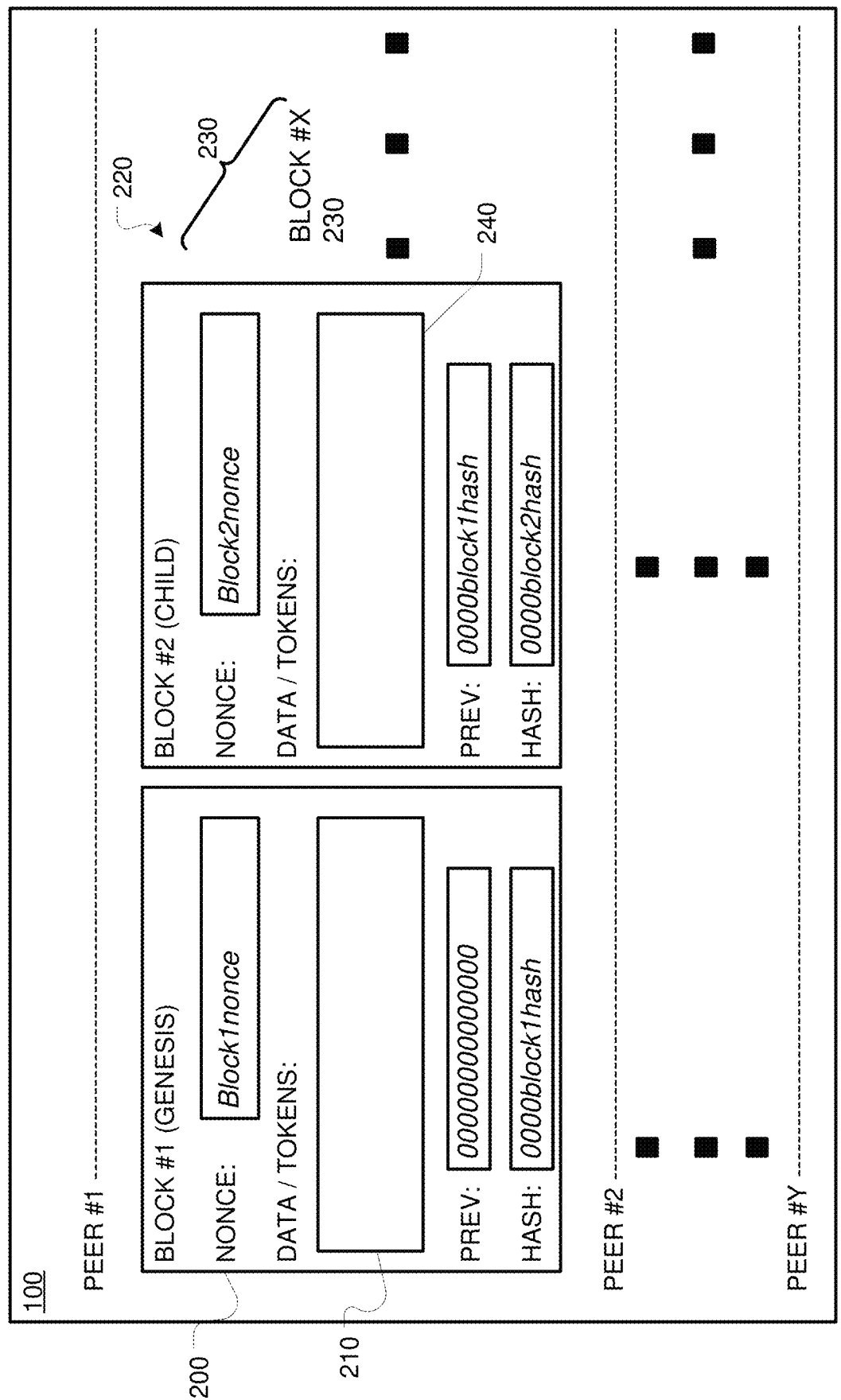
FIG. 2 illustrates an exemplary configuration of elements of the systems, components, computer-implemented methods, and exemplary processors of FIG. 1.

With continued reference to FIG. 1, and now also to FIG. 2, the processors and related computing, hardware, and software systems and methods of operation 100 are configured to enable and utilize any number of open source blockchain systems. Such blockchains may include for example, without limitation, those contemplated for fungible and non-fungible open source blockchain and token configurations described and contemplated by Ethereum Requests for Comment (ERC) ERC-20 (fungible tokens) and ERC-721 (non-fungible tokens), among many other equally viable and exemplary configurations that should be known to those having ordinary skill in the fields of blockchain technologies.

For example, such blockchains and tokens in their simplest form can be depicted as shown in FIG. 2 wherein system 100 includes a blockchain-enabled distributed digital ledger (DDL) distributed across multiple peers number 1, 2, through some maximum peer numbered Y, which peers may number in the dozens, hundreds, thousands, and more. Each peer in the blockchain DDL system 100 will maintain one or genesis blocks #1 (200), each having or containing genesis data/token 210, which may form the basis of respective blockchains. Each such genesis block 200 forks child block chains 220 formed from child blocks 230 that are forged to fork off from the respective genesis block(s) 200. The groups of three-dots shown horizontally and vertically contemplated the many peers, blocks 2 through X (230), and blockchains established thereby.

Figure 3:
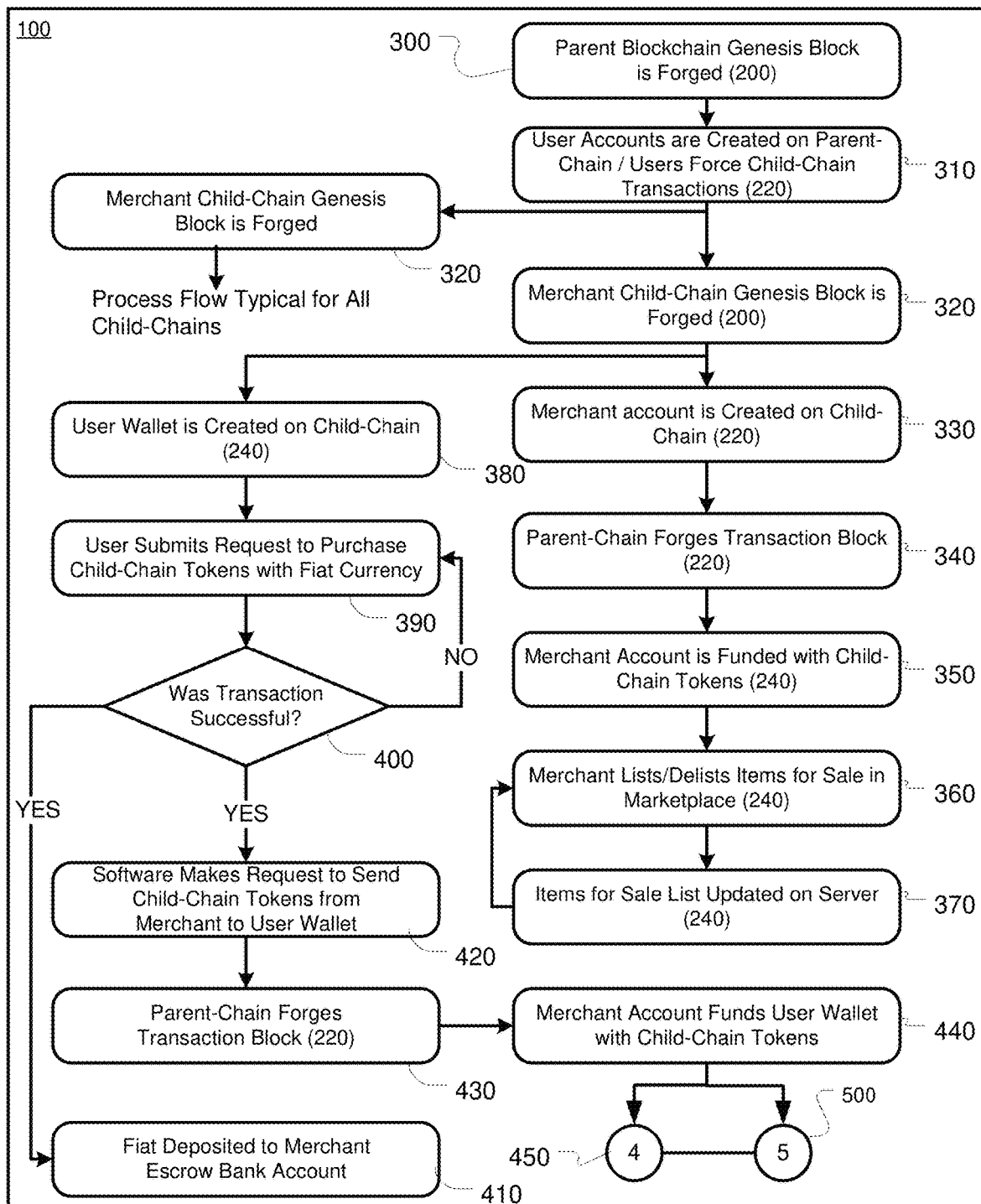
FIG. 3 depicts another exemplary configuration of the embodiments of FIGS. 1 and 2.
Figure 4:
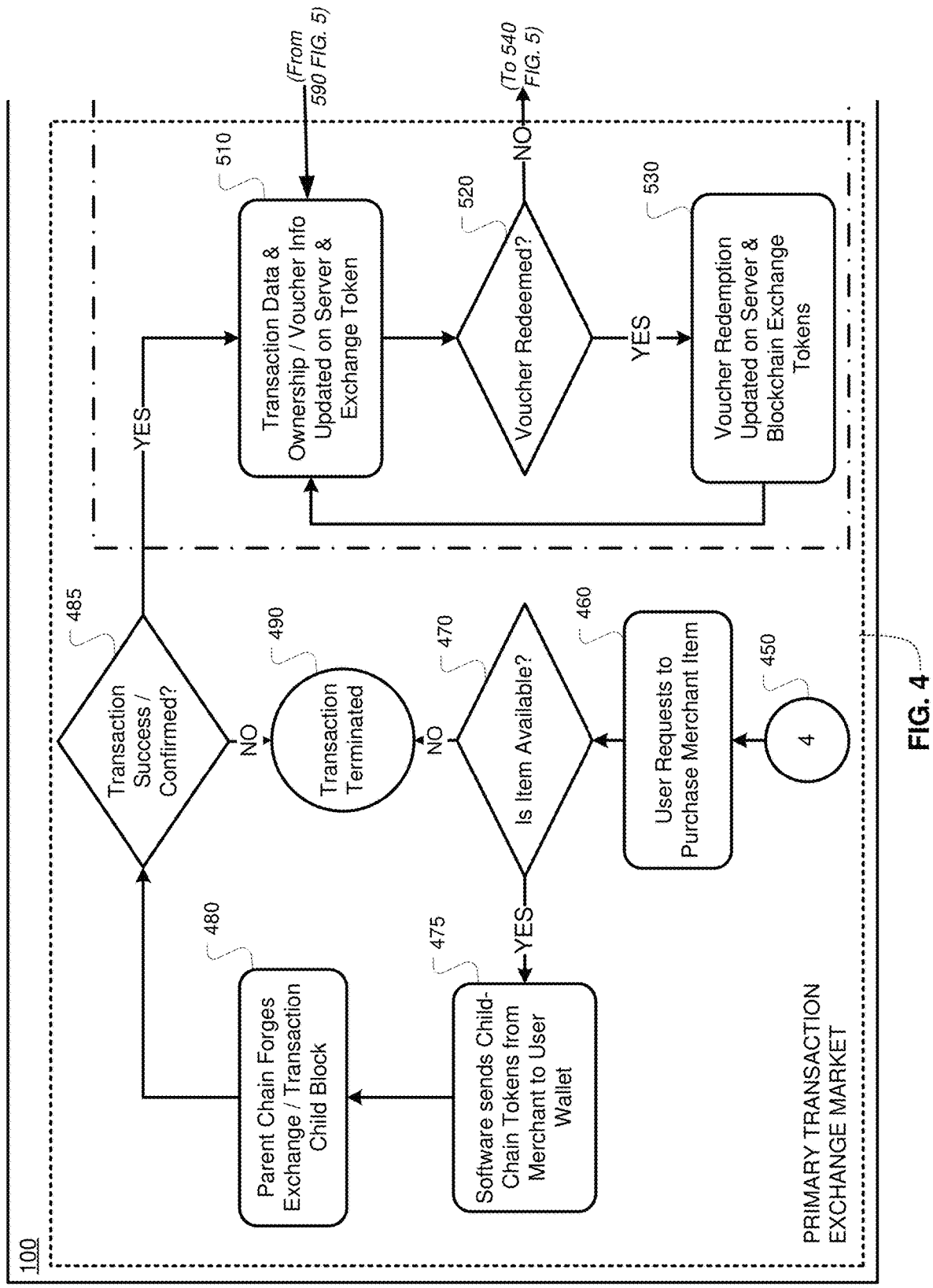
FIGS. 4 and 5 are extensions of the example configurations of the preceding figures, including especially FIG. 3.
Figure 5:
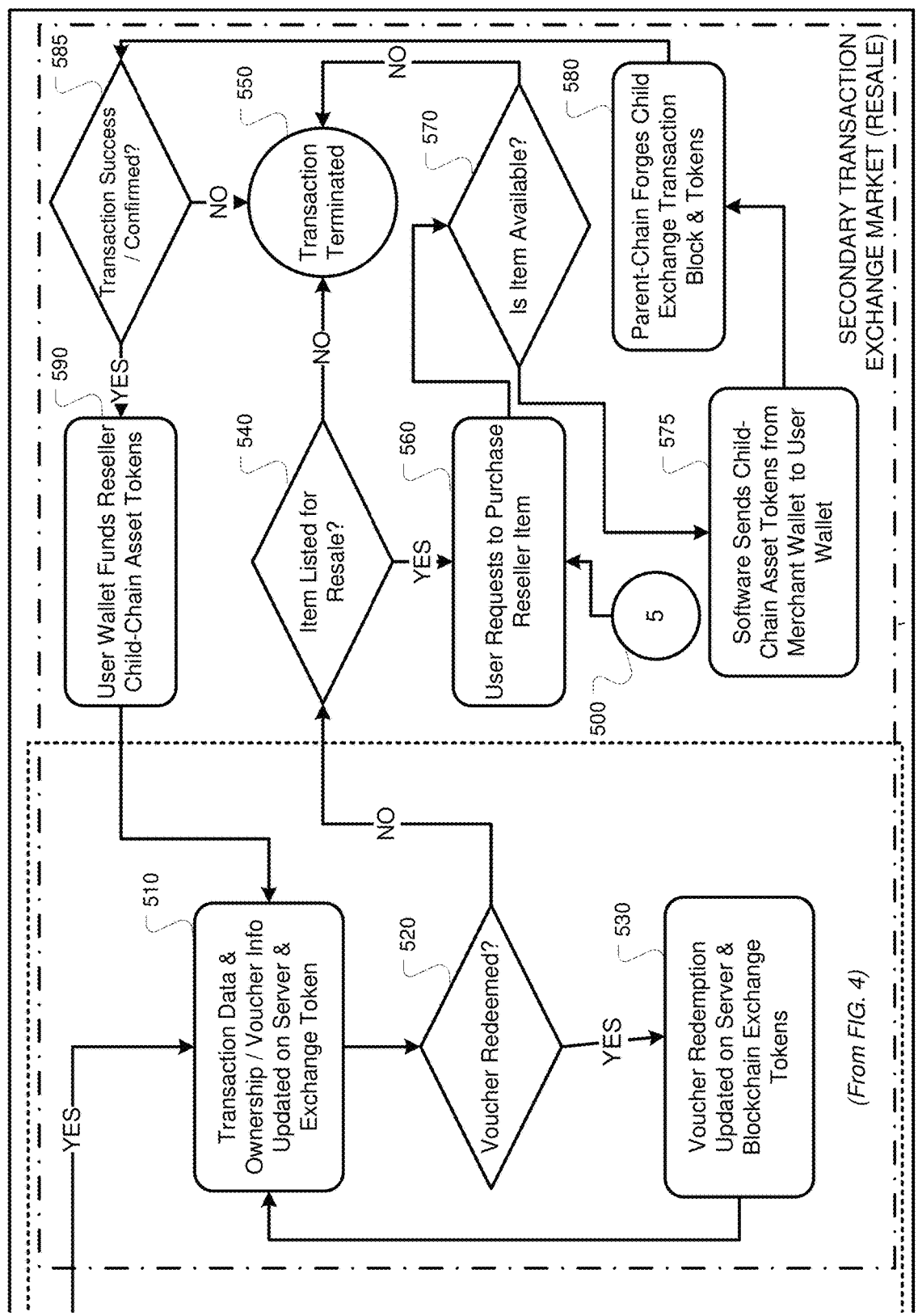

FIGS. 3, 4, and 5 illustrate an exemplary block diagram of hardware and computer-implemented methods of operation of system 100 according to embodiments described herein. FIG. 3 illustrates an exemplary transaction between a merchant and users for exchanging or selling and reselling products on the closed-loop blockhain gateway and system 100 according to embodiments described herein.

The system, components, processors, and computer-implemented methods of operation 100 are configured to electronically forge genesis blocks 200 of the contemplated blockchains that form the closed loop blockchain transactional exchange system 100. The forged blocks include and or identify one or more cryptographic, asset, access right, and other genesis tokens 210 containing data, credentials, and information of the exchange. These methods, components, and systems 100 are further configured to electronically forge one or more merchant and user child blocks 220, 230 that are each forked from the genesis block 200 and have one or more respective merchant and user cryptographic, asset, access right, account, and other tokens 240 having data and credentials.

The system and methods of operation 100 are also configured to electronically identify one or more salable merchant products and or services, by forging at least one merchant asset child block 220, of the one or more merchant child blocks 230, which each have at least one merchant product asset token 240 corresponding to the one or more salable merchant products and or services. A one to one, many to one, and one to many relationship between blocks 220, 230, and tokens 240 (that identify or digitally represent or comprise products and services) may be implemented.

In FIG. 3, system 100 is depicted as configured to forge at 300 a parent genesis block 200, from which the blockchain of system 100 will fork all child-chain blocks 220, 230. User accounts are forged by child blocks 220 at step 310. New merchants are established on the blockchain at steps 320 by forging merchant genesis blocks forked the parent genesis blocks, which in turn establish child blockchains for each respective merchant. A merchant account child block 220 is forged therefrom at step 330, and a transaction child block chain is forged by child block 220 at step 340. Each merchant account at step 350 is funded with merchant fiat asset tokens 240, and merchants then list and delist products, goods, and services on system and exchange 100 at steps 360, 370, wherein merchant child blocks 220 are forged with merchant asset tokens 240 corresponding to one or more merchant products, goods, and services.

System and exchange 100 at step 380 of FIG. 3 establishes user accounts by forging user child blocks that represent user electronic wallets 240. A user may fund the electronic wallet at step 390, via an internal or external payment server 130, and if successful at step 400, a merchant child block 220 and merchant asset token 240 is forged at step 410 to identify that a merchant escrow account is funded with user currency, coinbase, or other form of payment funding, such that the merchant can then fund the user electronic wallet with merchant fiat, at step 420, after which at step 430 a merchant and or user child block and corresponding asset token are forged, and the merchant to user fiat transfer is completed at step 440.

Exemplary embodiments may include merchant specific blockchain transactions configured to limit the resale of a good or service to closed-loop marketplace and system 100 prior to redemption or consumption of the good or service. Blockchain transactions may be peer-to-peer, encrypted, verified across a network of nodes, and any combination thereof to increase security, streamline transaction verification, and/or reduce cost and/or transaction time. Network transactions between user and merchant devices, and/or merchant servers used to initialize blockchain transactions may also be encrypted. Methods of encryption may include hardware encryption, software encryption, or any combination thereof to obtain a desired level of security.

Although embodiments of the system, components, processors, and computer-implemented methods of operation 100 are described and illustrated herein in terms of event digital and electronic tickets or on-line purchasing, it should be understood that embodiments of are not so limited, but are additionally applicable to other exchanges of goods and services. For example, any exchange for any service or for consumable goods are also within the scope of the present disclosure. Exemplary embodiments include systems and methods to limit the resale of goods and services such that a seller can sell to the ultimate consumer of the good or service.

Event tickets and other limited merchandise are frequently purchased in bulk by automated, electronic, on-line bots within seconds of their release for sale through an electronic medium, such as system available prior to the system 100 contemplated herein. Resellers utilizing such automated bots thereafter create a new aftermarket that may significantly mark up prices, and which leaves the original merchant without any means to authenticate legitimate end users, prevent fraud, control quality, or to interact with users or consumers. Further, current ticketing methods are antiquated and limit options that offer added convenience and merchandise opportunities for fans, artists, and venues.

The exemplary systems and methods of operation 100 described herein enable product transactions that can be made via digital asset exchanges, using a network of unique blockchains, specific to each merchant. Transactional data can be stored within system 100, which can then be used to validate purchases at the time of redemption. These blockchain transactions may include, but are not limited to, transfers of digital assets and transfers of redemption codes specific to a good or service. Exemplary embodiments may therefore include using merchant-specific block chain transactions to limit the resale of a good or service to a closed-loop marketplace prior to the redemption or consumption of the good or service.

The merchant may then use and exchange its child-chain merchant asset tokens 240 with users, and users may create 380 the digital wallet account 220 on the merchant child blockchain. The user first creates 380 an account 220 on both the merchant system or network 100 and the blockchain. These can be created simultaneously through a single user input to create an account. The user may then have access to individual wallets, which can be used to store each merchant's unique fiat or currency.

As noted, users may fund digital wallet accounts via a third party payment server 130. The user buys tokens from the merchant's child blockchain in exchange for another currency, such as U.S. dollars paid by electronic transfer, or by wire transfer, credit card, debit card, PayPal, Braintree, etc. The user purchases 390, 400, 410, the merchant's digital fiat or currency with the deposited funds. The merchant deposits 420, 430, 440 its digital currency into the digital wallet of the user via block chain transaction.

In an exemplary embodiment, the system 100 includes an application resident on a user's machine 110, 120 or on a remote server 130 accessed through network 190, such as a web or on-line website browser. The system 100 is configured to display to the user a user interface 100, 120, 140. The user interface 110, 120, 140 may include one or more areas to display and/or receive information to and from the user. The user interface 110, 120, 140, for example, may be configured to receive information from the user to create a user account and initiate a user digital wallet on the merchant's network and/or the blockchain. In an exemplary embodiment, system 100 is configured to receive the information from the user through the user interface 110, 120, 140, and to communicate the information to a remote server 130.

The system 100 may thereafter update information stored 150 at a server 130 accessible and/or controlled by the merchant and/or server(s) 130 that are utilized to enable closed loop blockchain gateway and system 100. The user interface 110, 120, 140 is also configured to receive instructions from the user for sales and/or purchase request of one or more merchants. The user interface 110, 120, 140 permits a user to provide payment information to fund accounts for paying for purchase of the digital asserts of the merchant currency.

Digital assets (merchant currencies or fiat) can therefore be purchased using traditional transaction methods as received through the user interface 110, 120, 140. The system 100 is configured such that a user's wallet may be funded with the digital assets after their purchase by initiating a blockchain transaction 400-440 between the merchant and client wallets. System and methods of operation 100 may therefore communicate the purchase information to transfer payment from the user to the merchant and thereafter send instructions to log the transaction between the merchant to the user of the digital currency on the blockchain DDL of system 100.

In an exemplary embodiment, blockchain transactions may be initiated by entering a user-defined password or pin. In the case of products redeemable by digital or electronic vouchers, system 100 may create a unique scannable feature (such as a barcode, QR code, etc.) with elements stored on the merchant blockchain and the merchant's database. The scannable code or feature may be delivered to the owner of the voucher for redemption. Although scannable features are disclosed, other identifiers may also be used, such as a specific identification number, password, fingerprint, keyword, image, instruction set, ticket, etc. that may be digital and/or printable and electronically scannable.

The user's identity may be made available to merchants at the time of voucher redemption via software to verify ownership. To add a second layer of security, an access pin number may also be required by merchants to access the voucher or scannable feature. The user may then use its digital currency to purchase goods and services offered by merchant. A user may purchase event tickets or other identified merchandise using the digital currency purchased from the merchant.

The user may purchase directly from the merchant or from other users within the closed exchange. If purchasing from the merchant, the user's digital currency tokens are transferred to merchant's wallet in the amount of the sale via blockchain transaction. If purchasing from another user, the user's digital currency tokens are transferred to the other user's wallet in the amount of the sale via blockchain transaction. In either case, transactional information, including purchasers account information may be updated on merchant's server or system 100 and/or the blockchain for identification. In the case of voucher/tickets, transactional information may be verified at the time of redemption via a call or lookup to the merchant's service and blockchain verification.

Exemplary embodiments may include creating and defining 320 unique merchant blockchains as child-chains of a parent blockchain, which may then be used to forge transactions across all child chains. As described elsewhere herein in connection with FIG. 5, users may exchange digital assets with each other through the network 190, both on unique merchant blockchains and between merchant blockchains configured as child-chains of the parent forging blockchain. In an exemplary embodiment, blockchain transactions may be verified across a decentralized network 190 of blockchain users, whose computers 110, 120, 140 store transaction ledgers as DDL peers and which forge new transactions on the blockchain of system 100.

In another exemplary embodiment, the system 100 functions as a closed-loop gateway 100 in which merchandise and/or services may be exchanged, driven by blockchain transactions, which act to transfer unique, merchant-specific digital assets between buyers and sellers. The blockchain transactions may also trigger encrypted data updates on a centralized group of servers to specify product ownership for redemption after a purchase.

In exemplary embodiments, large, decentralized network 190 may be used to execute functions of the method described herein. In exemplary embodiments, a centralized network 190 of computers may be used to provide faster transaction speeds by reducing or eliminating forging commission transaction algorithms. As noted previously, FIGS. 3, 4, and 5 illustrate exemplary block diagrams of hardware and computer-implemented methods of operation according to embodiments described herein. FIG. 4 describes a transaction between a merchant and an user purchasing goods or services, while FIG. 5 depicts a transaction between a reseller and a subsequent purchaser.

In continuing examples, system 100 is configured to enable users to purchase the one or more goods and/or services at steps 450, 460, 500, 560. If the request is to the merchant and its product or service is available at step 470, then merchant child blocks 220 and asset tokens 240 are forged at steps 475, 480, which if successful at step 485, terminates the exchange or transaction at step 490. If the requested product or service is not available at step 470, the transaction terminates at 490. The user will thereafter receive a digital receipt that may be a redeemable electronic or digital voucher 510, reflecting ownership of the purchased goods and/or services, and when subsequently redeemed 520, the digital asset will transfer from the user wallet back to the merchant 530. The digital receipt may include the voucher and/or scannable feature contemplated herein.

A user who previously purchased a good or service is permitted to resell the purchased good or service to another user on the closed loop blockchain gateway and system 100. The seller, through a user interface 110, 120, 140, may identify the good or service for resale along with a value in the digital asset. Another user may thereafter, through system 100, indicate a desire to purchase the good or service at steps 500, 560. The system 100 may be configured to identify the good or service 540 and track the origin through the first user to the merchant.

System 100 may therefore identify an original purchase price for the item. The merchant may configure the closed-loop gateway and system 100 to limit the resale of a good or service, to provide profit sharing and or payment back to the merchant for the resale of a good/service, or other resale limit or restriction or requirement before a subsequent exchange is permitted. For example, as illustrated in FIG. 5, once the second user confirms the transaction 570 and the digital wallet of the second purchaser is identified, system 100 may be configured to determine a profit amount between the original transaction sale price and the subsequent transaction sale price.

System 100 may then be configured at steps 575, 580 to move the digital asset from the second purchaser to the first purchaser for the resale of the product and provide a digital confirmation of the ownership transition at step 585, 590 from the first purchaser to the second purchaser. The system 100 may also be configured to transfer the profit amount or some portion thereof to the merchant wallet and/or to the first purchaser wallet. In this way, the merchant can restrict with exchange limits, resale and/or impose profit sharing on any resold items on the closed loop gateway and system 100.

In an exemplary embodiment, the system 100 is configured to receive information from the merchant including restriction instructions in the event of a resale. The restriction instructions may include any combination of limitations or requirements on a resale of a good or service sold on the closed-loop gateway. For example, the merchant may indicate a percentage of any profit that must be shared with the merchant in the event of a resale above the original transaction price.

In addition, a percentage of any profit may be distributed to another account at the time of resale. Other accounts for fund distribution may include, for example, merchant shareholders, charity, or other users. Resale restrictions may distribute payment of any profits to the reseller in merchant child-chain tokens, which then may only be spent on merchant goods or services. Resale restrictions or fund distribution preferences may be configurable by the merchant within the merchant's user interface. The merchant may prevent further resale or transactions on a good or service. The merchant may first require consent from the merchant to the resale, and may receive information on the resale of the good/service, such as sales amount, subsequent purchaser, etc.

Exemplary embodiments described herein may be used to create and define a single sales platform or may be embedded into customized user interfaces, using an SDK. In the case of integration, the software may still perform and function as described herein, with the exception of the user interface used to perform transactions. The merchant may login to their secured account, where products can be uploaded for sale in their own unique blockchain currency. Like user's, merchants may have their own wallets, but initially funded with all currency on their unique blockchain. The merchant wallet may function as a coinbase to all client purchases of digital assets. The software may distribute funds at the time of a funding transaction or sale, per software settings. In an exemplary embodiment, merchants may have access to a unique, transaction code scanning applications for in-person transactions. As mentioned above, clients may enter a password or access pin number on the merchant's scanning device to complete transactions.

In exemplary embodiments, the system and methods may be scaled to create a broad payment gateway for completing blockchain transactions outside of a single platform, similar to credit card functionality. In addition, a digital asset exchange could be built, allowing the exchange of all merchant blockchains configured as child-chains of the parent forging blockchain.

The methods and components of the system 100 also receive by the network 190 from the key pair server 130, and in response to a first user request, a private key token for a private key of the user, which corresponds to a public user key, which may be stored in the child user blocks and tokens contained therein.

One or more user account tokens and access right tokens, of the one or more user child blocks that correspond to the private key are also identified by the system components and operation methods to enable electronic user authentication and verification. The system also is configured to electronically receive by the network a first user payment via the payment server, which corresponds to the identified one or more user account tokens. The system components receive the payment, by forging payment merchant and user child blocks in the blockchain, wherein each block has a merchant fiat asset token that identifies the first user payment.

The system components and methods of operation, including for example the contemplated processors, also exchange for the first user payment, one or more of the identified merchant products, by forging merchant and user product exchange child blocks in the blockchain or blockchains of the system, in response to the first user payment, wherein each forged block includes generated merchant asset exchange tokens identifying the one or more merchant products that are exchanged.

Such computer-implemented methods, processors, components, and systems are also configured to electronically generate a merchant access right token, which defines at least one and or one or more exchange limits sale and resale of one or more salable merchant products. The exchange sale and resale limits include, for purposes of example but not for limitation, at least one and or one or more of a predetermined: (1) number of sales and resales, (2) price, (3) price range, (4) profit, (5) profit range, (6) profit sharing percentage, (7) quantity, (8) purchaser identity (which can include identities prohibited from purchasing, permitted to purchase, and a combination thereof), and or (9) purchaser geographic location and region, among other possible exchange sale and resale limits. Merchants can in this way electronically assign rights and rules to salable products and services, especially for digitally enabled and or represented products and services, to address problems of prior systems.

In variations, the contemplated components, systems, computer-implemented methods, and processors are configured to electronically generate one or more or at least one user digital wallet asset token that is identified and or contained by at least one forged user child block in the blockchain(s) of the system. Here, the at least one user digital wallet asset token further identifies one or more received user payments, merchant fiat asset tokens, merchant coinbase asset tokens, and other user and merchant asset tokens, which are and may be established by the closed loop transactional exchange and gateway systems, components, and methods of operation.

Further optionally preferred arrangements of the computer-implemented methods, processors, components, and systems, are configured to electronically forge at least one merchant asset child block in the contemplated blockchain(s), which identify a salable digital event ticket of the one or more salable merchant products and services, and a corresponding merchant asset token, among other elements.

This variation further contemplates a redeemable digital voucher asset token is generated that also corresponds to the salable event ticket, and which is generated responsive to detection an exchange of the salable event ticket for the user payment. In this adaptation, a user child block of the blockchain is forged that identifies the redeemable voucher and salable event ticket.

Here, the components, systems, computer-implemented methods, and exemplary processors are also configured to verify a user identity, in response to electronically detecting redemption of the digital redeemable voucher, by identifying at least one of merchant and child blocks having one or more of a user identity account token, the digital event ticket merchant asset token, and other asset tokens. In alternative arrangements of these configurations, a redeemable digital voucher asset token may also be generated, which corresponds to the salable event ticket, and in response to detecting an exchange of the salable event ticket for the user payment.

The contemplated redeemable digital voucher asset token includes at least one of a human readable digital voucher and optical character reader scannable code. The forged user child block may in this variation identify the redeemable voucher, scannable code, and salable event ticket, which are among the one or more salable merchant products. Verification of the user identity is effected in response to communication of at least one of the digital redeemable voucher and scannable code, and is accomplished by identification of at least one of merchant and child blocks having one or more of the user identity account token, the digital event ticket merchant asset token, and other asset tokens, which correspond to at least one of the digital redeemable voucher and or scannable code.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computer-implemented method for establishing a closed loop transactional exchange blockchain, comprising:
   a processor coupled to a network in communication with one or more storage devices, each of a cryptographic key pair server, a payment server, and a storage server, and a closed loop transactional exchange blockchain across the cryptographic key pair server, the payment server and the storage server, the processor electronically operable to
   forge a genesis block of a closed loop transactional exchange and identify one or more of any of a cryptographic token, an asset token, an access right token, and other genesis tokens of the closed loop transactional exchange blockchain,
   forge one or more merchant child blocks wherein each merchant block is forked from the genesis block and having one or more cryptographic tokens, asset tokens, access right tokens, account tokens, and other merchant tokens,
   identify one or more salable merchant products by forging at least one merchant asset child blocky of the one or more merchant child blocks each having at least one merchant product asset token corresponding to the one or more salable merchant products,
   receive from the cryptographic key pair server, responsive to a first user request, a private key token for a private key,
   identify one or more user account tokens and access right tokens of a user child block that correspond to the private key,
   receive a first user payment via the payment server, corresponding to the identified one or more user account tokens, by forging payment merchant blocks in the blockchain and user child blocks in the blockchain each of the payment merchant blocks and the user child blocks having a merchant fiat asset token identifying the first user payment,
   exchange for the first user payment, one or more of the merchant products, by forging merchant and user product exchange child blocks, in response to the first user payment, wherein each forged exchange child block includes merchant asset exchange tokens generated to identify the exchanged one or more merchant products, wherein the closed loop transactional exchange blockchain electronically restricts purchase and sale of the one or more merchant products by the processor, according to merchant exchange restriction preferences that enable the closed loop transactional exchange blockchain as to the first user payment and one or more subsequent user payments, and generate a merchant access right token prior to a redemption or a consumption of the one or more saleable merchant products.

2. The computer-implemented method according to claim 1, further comprising:
the processor electronically operable to
generate the merchant access right token defining exchange limits of the merchant exchange restriction preferences, on resale of the identified one or more salable merchant products, wherein the first user payment is received subject to the exchange limits.

3. The computer-implemented method according to claim 1, further comprising:
the processor electronically operable to
generate the merchant access right token defining exchange limits of a predetermined number of resales of the identified one or more salable merchant products, wherein the first user payment is received subject to the exchange limits.

4. The computer-implemented method according to claim 1, further comprising:
the processor electronically operable to
generate the merchant access right token defining exchange limits on at least one of a resale price, price range, profit range, and profit sharing percentage, of the identified one or more salable merchant products, wherein the first user payment is received subject to the exchange limits.

5. The computer-implemented method according to claim 1, further comprising:
the processor electronically operable to
generate the merchant access right token defining exchange limits on a resale quantity of the identified one or more salable merchant products, wherein the first user payment is received subject to the exchange limits.

6. The computer-implemented method according to claim 1, further comprising:
the processor electronically operable to
generate the merchant access right token defining exchange limits on a resale purchaser identity of the identified one or more salable merchant products, wherein the first user payment is received subject to the exchange limits.

7. The computer-implemented method according to claim 1, further comprising:
the processor electronically operable to
generate the merchant access right token defining exchange limits on at least one resale purchaser geographic location and region, for the identified one or more salable merchant products, wherein the first user payment is received subject to the exchange limits.

8. The computer-implemented method according to claim 1, further comprising:
the processor electronically operable to
generate at least one user digital wallet asset token identified by at least one forged user child block, wherein the at least one user digital wallet asset token further identifies one or more received user payments, merchant fiat asset tokens, merchant coinbase asset tokens, and other user and merchant asset tokens established by the closed loop transactional exchange blockchain.

9. The computer-implemented method according to claim 1, further comprising:
the processor electronically operable to
forge at least one merchant asset child block that identifies a salable digital event ticket of the one or more salable merchant products and a corresponding digital event ticket merchant asset token,
generate a redeemable digital voucher asset token corresponding to the salable event ticket, responsive to detection of an exchange of the salable event ticket for the user payment,
forge a user child block that identifies the redeemable voucher and salable event ticket, and
verify a user identity, responsive to detecting redemption of the digital redeemable voucher, by identifying at least one of merchant and user child blocks having one or more of a user identity account token, the digital event ticket merchant asset token, and other asset tokens.

10. The computer-implemented method according to claim 1, further comprising:
the processor electronically operable to
forge at least one merchant asset child block that identifies a salable digital event ticket of the one or more salable merchant products and a corresponding digital event ticket merchant asset token,
generate a redeemable digital voucher asset token corresponding to the salable event ticket, in response to detecting an exchange of the salable event ticket for the user payment, wherein the redeemable digital voucher asset token includes at least one of a human readable digital voucher and optical character reader scannable code,
forge a user child block identifying the redeemable voucher, scannable code, and salable event ticket of the one or more salable merchant products, and
verifies a user identity responsive to communication of at least one of the digital redeemable voucher and scannable code, by identifying at least one of merchant and user child blocks having one or more of a user identity account token, the digital event ticket merchant asset token, and other asset tokens that correspond to at least one of the digital redeemable voucher and scannable code.

11. The computer-implemented method according to claim 1, further comprising:
the processor electronically operable to
generate the merchant access right token that defines exchange limits that enables at least one of a predetermined number of resales, resale price, resale price range, resale profit, resale profit range, and resale profit sharing percentage, of the identified one or more salable merchant products,
receive, subject to the exchange limits, a second user payment via the payment server, by forging user and merchant child blocks identifying the second user payment and corresponding to a second user account token and second access right token, of the one or more user account and access right tokens, and
exchange for the second user payment a merchant product of the one or more of the merchant products, by forging new user and merchant child blocks that each identify at least one of the exchange, an identity of the second user, and the second user payment.

\* \* \* \* \*